United States Patent [19]

Gonnam et al.

[11] Patent Number: 4,675,774
[45] Date of Patent: Jun. 23, 1987

[54] DIRECT TRANSFER TRIP APPARATUS FOR USE WITH AN ACTIVE PILOT WIRE COMMUNICATIONS CHANNEL

[75] Inventors: Russell W. Gonnam; Shan C. Sun, both of Coral Springs, Fla.

[73] Assignee: Westinghouse Electric Corp., Pittsburgh, Pa.

[21] Appl. No.: 808,768

[22] Filed: Dec. 13, 1985

[51] Int. Cl.⁴ .................... H02H 7/26; H02H 3/30
[52] U.S. Cl. ........................... 361/64; 361/69; 361/85
[58] Field of Search ............ 361/44, 46, 47, 48, 361/49, 50, 62, 63, 64, 67, 68, 69, 85

[56] References Cited

U.S. PATENT DOCUMENTS

| | | | |
|---|---|---|---|
| 4,408,246 | 10/1983 | Ray | 361/64 |
| 4,464,697 | 8/1984 | Sun | 361/64 |
| 4,513,340 | 4/1985 | Drain | 361/62 |
| 4,538,195 | 8/1985 | Elmore | 361/64 |

Primary Examiner—A. D. Pellinen
Assistant Examiner—H. L. Williams
Attorney, Agent, or Firm—W. E. Zitelli

[57] ABSTRACT

Direct transfer trip apparatus for sharing a common active communication channel utilized for signal transfer between at least two electromechanical units which form a current differential protective relay for protecting at least one power line in a power system network is disclosed. Each electromechanical unit includes an operating relay coil for effecting an interruption of current through the protected power line when an internal fault of the power line is detected. The direct transfer trip function induces signals to be transmitted through the common active communication channel either upstream or downstream from a faulted power line section where a breaker has failed to open. These direct transfer trip signals are supplied directly to an upstream or downstream breaker unit to operate the breaker to interrupt current through the faulted section independent of the energization of its corresponding operating relay coil. The direct transfer trip apparatus not only performs the aforementioned direct transfer trip function, but also permits disabling of the operating relay coil from effecting a power line interruption inadvertently. Accordingly, an inadvertent current interruption of the power line section by a corresponding operating relay coil is precluded during the transmission of the direct transfer trip signal over the common active communication channel.

4 Claims, 6 Drawing Figures

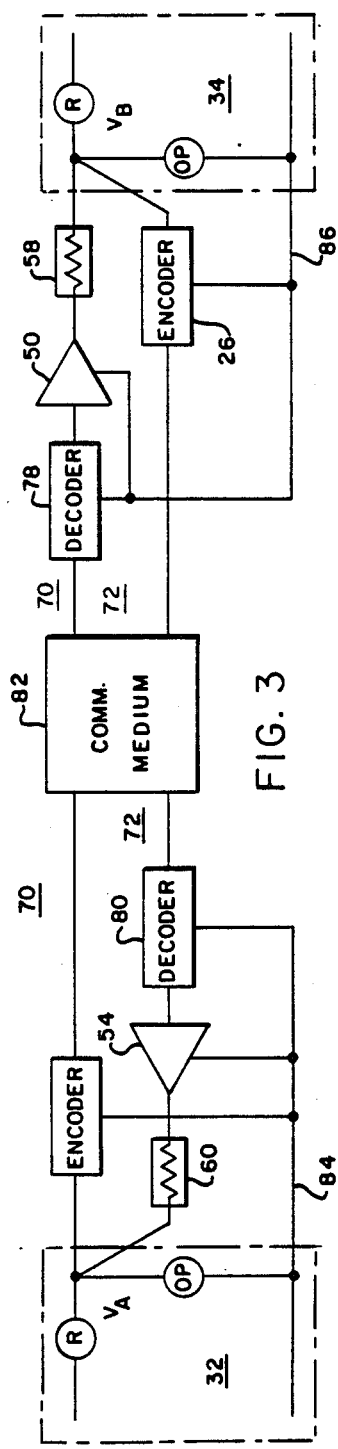
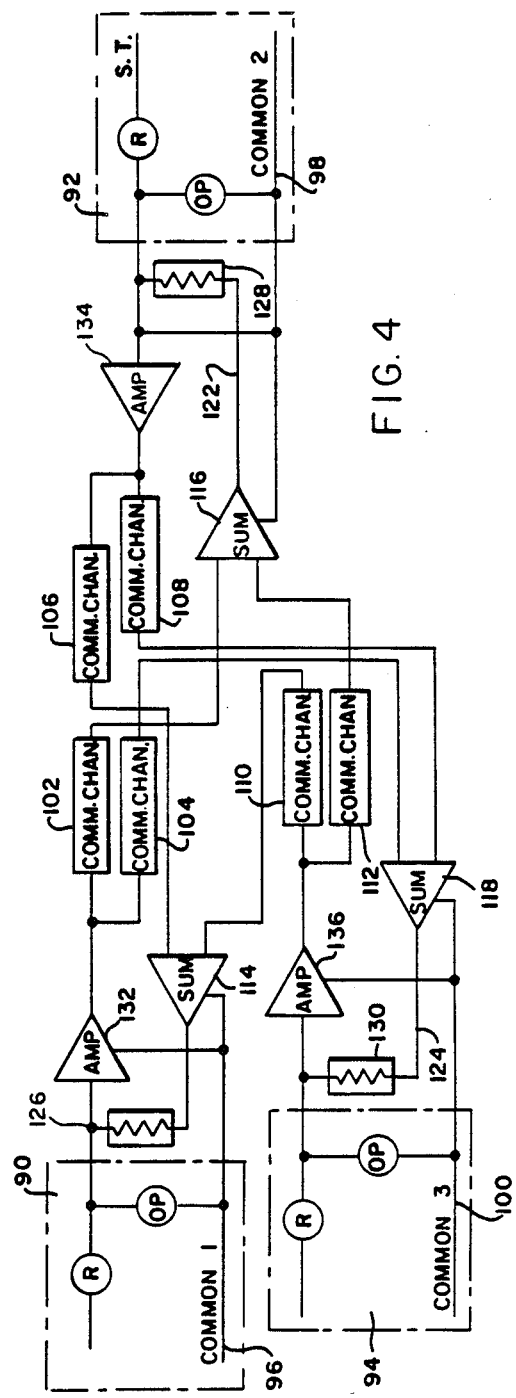
FIG. 3
FIG. 4

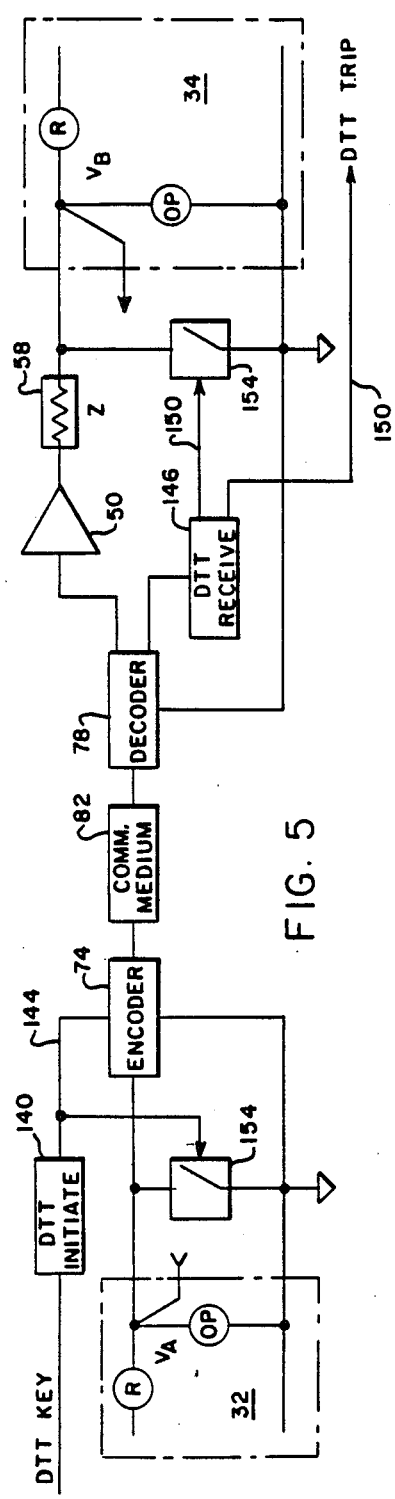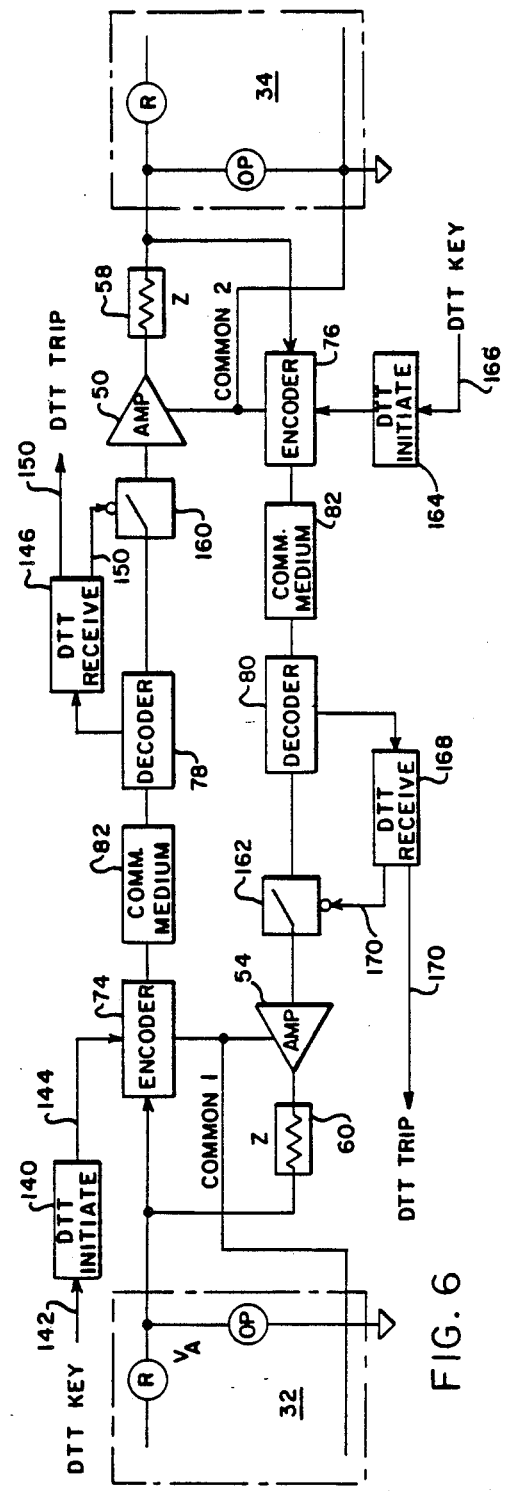

DIRECT TRANSFER TRIP APPARATUS FOR USE WITH AN ACTIVE PILOT WIRE COMMUNICATIONS CHANNEL

COPENDING APPLICATION

A patent application entitled "Active Pilot Wire Apparatus For Electromechanical Current Differential Relays" bearing Ser. No. 808,769, filed Dec. 13, 1985 and assigned to same assignee as the instant application is copending herewith.

BACKGROUND OF THE INVENTION

The present invention relates generally to electromechanical pilot wire protective relays, and more specifically to direct transfer trip apparatus for shared use with an active pilot wire communications channel which couples signals between electromechanical units of a pilot wire current differential relay.

Conventional electromechanical pilot wire differential relays using a continuous metallic wire pair to complete the protective relay circuit have long been applied to the protection of short power lines of a power system network. Exemplary of this type of protective relay is the Westinghouse HCB and/or HCB-1 which are described in the Westinghouse Electric Corporation publication "Applied Protective Relaying" 1979, pp. 14–1 through 14–9. This type of relay scheme is coupled to the protected line much in the same manner as that shown in the block diagram schematic illustration of FIG. 1.

These pilot wire relays for the most part have provided adequate protection of their power lines through the years. However, there have been times when the metallic pilot wires have caused severe relay mis-operations, especially during a line fault condition. Some of the mis-operations have occurred due to a station ground mat rise resulting from the fault condition. Others have resulted from electromagnetic interference (EMI) being coupled to the pilot wires which may be run longitudinally along the path of the protected power lines. In addition, further complications come from the necessity to obtain a right of way for and/or the leasing of the pilot wires which transactions are becoming increasingly more costly and difficult to negotiate. It has become of paramount importance to all parties concerned to overcome these drawbacks.

Some relay manufactures have developed more modern and sophisticated current differential relay systems to meet the aforementioned need. One such system is the Westinghouse LCB current differential relay which is described in the Marketing Bulletin B-796 (May, 1983) issued by the Relay and Telecommunications Division of Coral Springs, Florida. The U.S. Pat. No. 4,275,429 entitled "Protective Relay Apparatus" issued to Larry L. Church and Shan C. Sun on June 23, 1981 and assigned to the same assignee as the instant application also discloses a similar type relay. While these relays offer a total answer to the aforementioned drawbacks for present and future protective relay needs, they do not offer a viable pilot wire replacement or retrofit for the thousands of existing and deployed electromechanical pilot wire relays other than for a total replacement which for the most part would be considered cost prohibitive. Thus, a problem remains for the already installed electromechanical pilot wire relays.

The disclosure which follows proposes an active pilot wire coupling scheme which is offered as a direct replacement for the continuous metallic pilot wire pair of the presently installed electromechanical current differential relays. It is believed that such relays, like the Westinghouse HCB/HBC-1 relay, for example, may be readily interfaced with the disclosed scheme without the need of any relay modification thereby preserving completely the performance characteristics of the current differential relay.

In addition, some direct transfer trip functions for the conventional electromechanical pilot wire relays are implemented with a dedicated communications channel and separate equipment from that of the pilot wire relays. Others require the application of a separate control signal, such as in the Westinghouse HCB, for example, which uses a DC potential applied directly to the pilot wire for direct transfer trip control. With the foregoing proposed active pilot wire coupling scheme, it is possible to share the communication of both the relay signalling and direct transfer trip keying over the same active coupling channel. However, in doing so, it is imperative to absolutely preclude the possiblity of an inadvertent breaker operation associated with operation of the current differential relay during the direct transfer trip keying period. The following disclosure additionally proposes direct transfer trip apparatus for use with the active pilot wire coupling channel which apparatus also satisfying the aforementioned requirement.

SUMMARY OF THE INVENTION

In accordance with the present invention, direct transfer trip apparatus shares a common active communication channel utilized for signal transfer between at least two electromechanical units which in combination form a current differential protective relay for protecting at least one power line in a power system network. Each electromechanical unit includes an operating relay coil for effecting an interruption of current through the protective power line when an internal fault of the power line is detected. The direct transfer trip apparatus is operative to initiate a direct transfer trip signal corresponding to each electromechanical unit for shared transmission with the electromechanical unit signals over the common active communications channel and is further operative to receive the direct transfer trip signal from the common active communication channel and generate a trip signal in response thereto. The direct transfer trip apparatus further includes means for each electromechanicl unit governed by the trip signal of its respective electromechanical unit to render the corresponding operating relay coil disabled from effecting power line current interruption. Thus, an inadvertent current interruption of the power line by the operating coil is precluded during the transmission of the direct transfer trip signal over the common active communication channel.

BRIEF DESCRIPTION OF THE DRAWINGS

FIG. 3 is a block diagram schematic of active pilot wire apparatus suitable for embodying one aspect of the present invention;

FIG. 4 is a block diagram schematic of an alternate configuration of active pilot wire apparatus suitable for embodying another aspect of the present invention;

FIG. 5 is a block diagram schematic of direct transfer trip apparatus suitable for embodying another aspect of the present invention; and FIG. 6 is an alternate configuration of direct transfer trip apparatus suitable for embodying still another aspect of the present invention.

DESCRIPTION OF PREFERRED EMBODIMENTS

Figure 1:
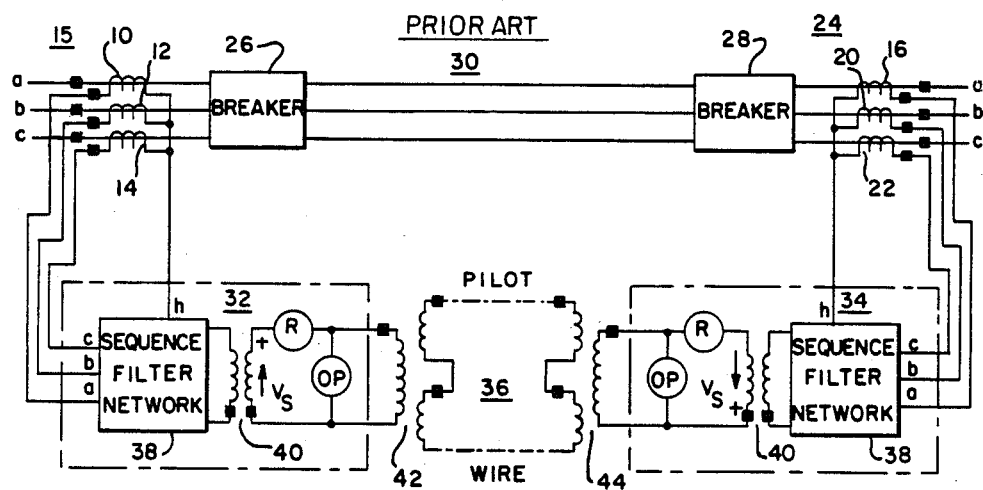
FIG. 1 is a block diagram schematic illustration of a conventioanl electromechanical current differential pilot wire relay in its operational environment.

A conventional electromechanical current differential pilot wire relay is shown in its operational environment in FIG. 1. A set of 3-phase power lines a, b and c which constitute a current path of a power system network, include at either end thereof corresponding current measuring devices. In the present embodiment, current transformers 10, 12 and 14 are coupled respectively to the power lines a, b and c at one end 15 thereof and current transformers 16, 20 and 22 are coupled respectively to the power lines a, b and c at the other end 24 thereof. In addition, breaker units 26 and 28 are coupled respectively at the ends 15 and 24 in close proximity to the aforementioned current transformers. The portion 30 of the power lines between the sets of current transformers at either end is considered the protected line portion.

The conventional current differential protective relay comprises two electromechanical units 32 and 34 and a continuous metallic pilot wire pair 36 for coupling the units 32 and 34 together. Each electromechanical unit 32 and 34 includes a composite sequence filter network 38 which functions to convert the current signals of its respective set of current transformers into a single-phase alternating voltage signal $V_s$. At each unit 32 and 34 the signal $V_s$ is coupled through a saturating transformer 40 to a cascaded-coupling of a restraint coil apparatus R and an operating coil apparatus OP. The current transformer windings are configured at the ends 15 and 24 of the set of power lines a, b and c such that the alternating voltage signals $V_s$ of the electromechanical units 32 and 34 are substantially 180° out of phase under normal or through fault conditions. This is denoted in the electromechanical units 32 and 34 by having an arrow pointed up to a plus sign (+) in the unit 32 and an arrow pointing downward to a plus sign (+) in the unit 34.

The pilot wire pair 36 is coupled to the units 32 and 34 in parallel across the operating coil apparatus OP in each case through insulating transformers 42 and 44, respectively. In operation, because of the resulting phase relationship of the alternating voltage signals $V_s$ of the electromechanical units 32 and 34 under no fault or through fault conditions, current is restricted solely to the restraint relay coils R and circulated through the pilot wire 36. However, during an internal fault of the protected line section 30, the phase relationship of the signals $V_s$ of the electromechanical units 32 and 34 may be reversed. As a result, little or no current is circulated through the pilot wire 36, the effect of which causing current to energize the operating relay coils OP which effect operation of the breakers 26 and 28 to interrupt current through the power line section 30.

As indicated in the Background section hereabove, the foregoing scheme is passive in nature and results in drawbacks due to the continuous metallic pilot wire pair connection between the electromechanical units 32 and 34. In accordance with the present invention, an active pilot wire apparatus replacement for the pilot wire pair 36 is proposed to alleviate most of the previously described drawbacks while preserving the operating characteristic of the conventional electromechanical pilot wire protective relay. That is, the proposed apparatus is designed to replace the pilot wire pair 36 or the pilot wire 36 in conjunction with the insulating transformers 42 and 44 with the capability of carrying the same or similar relay system current as that of the passive metallic pilot wire pair.

Figure 2:
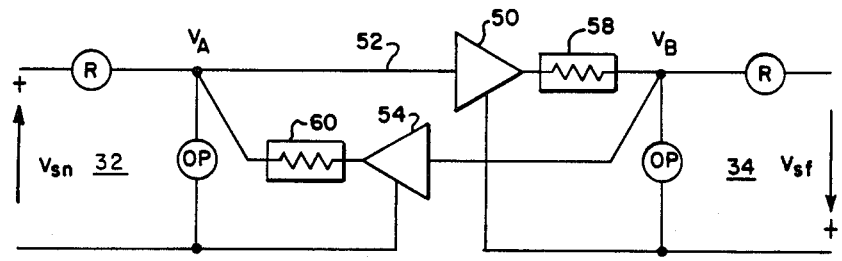
FIG. 2 is a schematic illustrating the basic concept of a proposed active pilot wire apparatus scheme.

The basic concept of the proposed active pilot wire apparatus scheme is depicted in the illustrative diagram of FIG. 2. Referring to FIG. 2, the alternative voltage converted from the current signals representative of the instantaneous power line current at the end 15 of the power lines is denoted as $V_{sn}$ and similarly, the converted alternating voltage at the other end 24 is denoted as $V_{sf}$. The up and down arrow phase notations are the same as that shown in FIG. 1. In the unit 32, the alternating voltage signal $V_{sn}$ imposes a voltage $V_A$ across its operating relay coil apparatus OP. Similarly, in the unit 34 the alternating voltage $V_{sf}$ imposes an alternating voltage $V_B$ across its operating relay coil apparatus OP. With an ordinary continuous metallic pilot wire pair connection between the units 32 and 34, the voltages $V_A$ and $V_B$ have an instantaneous phase relationship with each other which is determinative of a fault condition in the protected power line section 30.

In the functional embodiment of FIG. 2, a buffer amplifier 50 with high input impedance is shown coupled to the voltage $V_A$ through the signal line 52. Likewise, another buffer amplifier 54 also with high input impedance is shown coupled to the voltage $V_B$ through the signal line 56. Under this configuration, the voltages $V_A$ and $V_B$ should continue to exhibit the same amplitude and phase relationship with respect to each other as a configuration without the buffer amplifiers 50 and 54. The buffer amplifiers 50 and 54 are also designed with the capabilities of sourcing and sinking currents substantially identical to the nodes of voltages $V_A$ and $V_B$ coupled to a metallic pilot wire pair. Impedance elements 58 and 60 are coupled between the buffer amplifier 50 and voltage node $V_B$ and buffer amplifier 54 and the voltage node $V_A$, respectively. The impedance elements 58 and 60 are characteristic of the source impedance of their respective electromechanical unit plus the impedance of the pilot wire pair. In the present embodiment, the buffer amplifiers 50 and 54 are unity gain amplifiers which reproduce the voltages $V_A$ and $V_B$ at their respective outputs. In this manner, the currents through the impedance elements 58 and 60, which may be solely resistive, are substantially the same as that flowing through an equivalent metallic pilot wire pair coupling between the units 32 and 34.

A practical embodiment of the active pilot wire apparatus beyond that of the basic concept as shown in FIG. 2 is depicted in the block diagram schematic of FIG. 3. Referring to FIG. 3, there is included a communication channel 70 for coupling the voltage signal $V_A$ to the buffer amplifier 50 and another communication channel 72 which couples the voltage signal $V_B$ to the input of the buffer amplifier 54. Each of the communication channels 70 and 72 include a conventional encoder unit 74 and 76 and a conventional decoder unit 78 and 80. Coded or modulated signals are transmitted between the encoder and decoder units over a conventional communication medium denoted at 82. The communication medium may be any of the well-known types, like fiber optic cables, telephone circuitry, microwave channels, power lines carrier channels and fiber optical pulse-coded modulation channels, for example.

The encoder units 74 and 76 are operative in each case to convert their respective alternating voltage signal $V_A$ and $V_B$ into a coded transmittable signal representative thereof and transmit it through the communication medium to its respective decoder 78 and 80. Each decoder 78 and 80 is operative to reconvert the coded transmittable signal received thereby into an analog signal which is representative of its respective alternating voltage signal $V_A$ and $V_B$ which is presented to the high impedance input of its respective buffer amplifier 50 and 54. The buffer amplifiers 50 and 54 respond to the instantaneous alternating voltage signal at its input to generate with low source impedance an analog signal substantially representing the amplitude and phase of its respective voltage signal $V_A$ and $V_B$. Thus, current is conducted through the impedance elements 58 and 60 as a function of the voltage signals $V_A$ and $V_B$, substantially.

More specifically, each encoder unit 74 and 76 may operate to modulate a carrier signal in accordance with the magnitude and phase of its respective alternating voltage signal $V_A$ and $V_B$ to form its respective coded transmittable signal for transmission through the communication medium 82. And on the other end of the communication medium 82 each decoder unit 78 and 80 may operate to demodulate its received modulated carrier signal to form the substantially equivalent analog signal provided to the input of its respective buffer amplifier 50 and 54. Noteworthy is the fact that the return currents of the electromechanical units 32 and 34 are conducted over their own common return paths 84 and 86 and further, that the return paths 84 and 86 may be isolated from each other.

In operation, alternating voltage signals are generated at the outputs of the buffer amplifiers 50 and 54 which are substantially respectively representative of the voltages $V_A$ and $V_B$ in both amplitude and phase. As indicated above, under no fault or through fault conditions, the amplitude and phase relationship between the voltage signals $V_A$ and $V_B$ is such that all of the restraint relay coil current is diverted through the current branch of impedance elements 58 and 60 with little or no current available for energizing the operating relay coil apparatus to effect breaker operation. However, upon the occurrence of an internal fault condition, the instantaneous amplitude and/or phase relationship between the voltages $V_A$ and $V_B$ are changed such to diminish the current diversion through the impedance elements 58 and 60 permitting current to flow through the operating relay coil apparatus OP effectuating an energization thereof and an ultimate breaker operation. The return currents from both of the aforementioned paths may continue to flow through their respective common return paths 84 and 86 without a mixture thereof.

It is underststood that the present invention is not limited to an active pilot wire appartus coupling of only two electromechanical units of a current differential protective relay for protecting only a single set of 3-phase power lines as described in connection with FIGS. 1 through 3 hereinabove. The present invention may be extended to the coupling of a plurality of electromechanical units to form a current differential protective relay operative to protect against faults in a corresponding plurality of sets of 3-phase power lines with each set constituting a current path of a power sytem network. A block diagram schematic of an active pilot wire apparatus for coupling together three electromechanical units depicted in FIG. 4 exemplifies the aforementioned extended aspect of applicants' invention.

Referring to FIG. 4, each of the three electromechanical units depicted by the blocks 90, 92 and 94 may be coupled to its respective set of power lines through a corresponding set of current transformers (not shown) much the same as described in connection with the embodiment of FIG. 1. Similarly, each of the electromechanical units 90, 92 and 94 includes its own restraint relay coil apparatus R and operating relay coil apparatus OP. And in addition, each of the electromechanical units 90, 92, and 94 includes its own separate and independent current return path 96, 98 and 100, respectively.

In accordance with this extended aspect of the present invention, the active pilot wire apparatus includes a multiplicity of active communication channels for coupling each electromechanical unit to all of the other electromechanical units of the plurality. For example, the electromechanical unit 90 is coupled to the electromechanical unit 92 through the communication channel 102 and coupled to the electromechanical unit 94 through the communication channel 104. Similarly, the electromechanical unit 92 is coupled to the electromechanical units 90 and 94 through the communication channels 106 and 108 respectively; and electromechanical unit 94 is coupled to the electromechanical units 90 and 92 through the communication channels 110 and 112, respectively. The communication channels 102 through 112 comprise similar encoder/decoder and communication medium elements similar to those described in connection with the embodiment of FIG. 3.

In addition, the active pilot wire apparatus includes a plurality of buffer amplifiers 114, 116 and 118 corresponding to each of the electromechanical units 90, 92 and 94. Each of the buffer amplifiers 114, 116 and 118 is coupled to its respective communication channels and more particularly, the decoder elements thereof, for summing the reconverted analog signals generated by such respective decoder units. For example, the buffer unit 114 sums the analog signals of the communication channels 106 and 110, the buffer amplifier 16 sums the analog signals of the communication channels 102 and 112 and the buffer amplifier 118 sums the analog signals of the communication channels 104 and 108. Moreover, each buffer amplifier 114, 116 and 118 generates an analog signal 120, 122 and 124 which in each case is representative of the summation of its respective reconverted analog signals.

Still further, a plurality of impedance elements 126, 128 and 130 corresponding to each electromechanical unit 90, 92 and 94, respectively, may be disposed between its respective analog summation signal and corresponding operating relay coil voltage signal. The current diverted through the impedance elements 126, 128 and 130 is a function of the coupled signals at either end thereof. Additional amplifiers 132, 134 and 136 corresponding to the electromechanical units 90, 92 and 94, respectively, may be included in the active pilot wire apparatus to increase the power capabilities of driving a plurality of communication channels as govered by the operating relay coil voltage signal in each case.

The operation of the extended embodiment is similar in nature to that described in connection with the embodiment of FIG. 3 with the exception of the summation of voltage signals in the buffer amplifiers 114, 116 and 118. That is, the diversion of energizing current through the impedance elements 126, 128 and 130 from the corresponding operating relay coil apparatus OP is now dependent on the voltage signals from more than one other electromechanical unit.

Another feature of the common active communication channel approach is the inclusion of direct transfer trip apparatus to share the common channel utilized for signal transfer between the electrical units of the current differential protective relay. The direct transfer trip function induces signals to be transmitted either upstream or downstream from a faulted power line section where a breaker has failed to open. These direct transfer trip signals are supplied directly to an upstream or downstream breaker unit to operate the breaker to interrupt current through the faulted section independent of the energization of its corresponding operating relay coil. The instant feature permits sharing of the active pilot wire communication channel for performing the direct transfer trip function and permits disabling of the operating relay coil apparatus from effecting a power line interruption inadvertently. That is, an inadvertent current interruption of the power line section by a corresponding operating relay coil apparatus is precluded during the transmission of the direct transfer trip signal over the common active communication channel.

A suitable design for embodying the direct transfer trip (DTT) apparatus is shown in the block diagram schematic of FIG. 5. The communication channel may comprise the elements of an encoder 74, communication medium 82 and decoder 78 which are similar to the same numbered elements described in connection with the embodiment of FIG. 3. Accordingly, the communication channel couples the electromechanical units 32 and 34 by providing signal communication therebetween. In accordance with this inventive feature, a DTT initiate circuit 140 is governed by a DTT keying signal 142 to initiate a DTT signal 144 for shared transmission with the electromechanical unit signal $V_A$ over the common active communication channel between the two electromechanical units 32 and 34. In addition, a DTT receive circuit 146 is operative to receive the DTT signal 148 from the communications channel and generate a trip signal 150 in response thereto. In the instant embodiment, a switch 142 and 154 is coupled in parallel with the operating relay coil apparatus OP of its corresponding electromechanical unit 32 and 34, respectively. Each switch 152 and 154 which may be either an electronic or electromechanical type, for example, is governed to the closed position by the corresponding DTT signal 144 and 150, respectively, to permit total current diversion from the operating relay coil apparatus of its respective electromechanical unit, thereby precluding the operation thereof during the generation of the DTT signal.

An alternate design for embodying the direct transfer trip apparatus is shown in the block diagram schematic of FIG. 6. The instant embodiment takes advantage of the active pilot wire apparatus embodiment described in connection with FIG. 3. In the instant embodiment, switches 160 and 162 are coupled respectively between the decoder buffer amplifier combinations of 78/50 and 80/54. The switches 160 and 162 which may be either electronic devices or electromechanical devices, for example, are operative to pass or interrupt the analog signals reconverted by their respective decoder units.

The embodiment of FIG. 6 includes the additional apparatus of a DTT initiate circuit 164 for conducting the DTT keying signal 166 through another communication channel comprising the encoder unit 76, communication medium 82 and decoder unit 80 to a DTT receive circuit 168. In response, the DTT receive circuit 168 generates a trip signal 170 which is transmitted in the opposite direction of that of the trip signal 150.

The switches 160 and 162 are operated to the open position by the signals 150 and 170, respectively. When either switch 160 or 162 is operated to its open position, the voltage signal at the input of its respective amplifier 50 or 54 is altered to cause an increase in current through the respective impedance element 58 or 60. In this manner, the energization current of the operating relay coil is diverted through the parallel path of its corresponding impedance element which prevents energization of the operating relay coil apparatus in either case. In essence then, a DTT signal is permitted to share the communication channel of the active pilot wire pair apparatus and while doing so, the operating relay coil is precluded from being operated inadvertently to activate its corresponding breaker unit.

While various features of the present invention have been described hereinabvoe using various embodiments, it is understood that the present invention should not be limited in any way to such embodiments; but rather construed in breadth and broad scope according to the appended claim language.

We claim:

1. Direct transfer trip apparatus which shares a common active communication channel utilized for signal transfer between at least two electromechanical units which in combination form a current differential protective relay for protecting at least one power line in a power system network, each electromechanical unit including an operating relay coil means for effecting an interruption of current through said protected power line when an internal fault of said power line is detected, said direct transfer trip apparatus comprising:

first means, for each electromechanical unit, operative to initiate a direct transfer trip signal for shared transmission with said electromechanical unit signals over said common active communications channel between said at least two electromechanical units of said protective relay;

second means, for each electromechanical unit, operative to receive said direct transfer trip signal from said common active communication channel and generate a trip signal in response thereto; and third means, for each electromechanical unit, including a switch means coupled in parallel with the operating relay coil means, said switch means governed to a closed position by said trip signal of its respective electromechanical unit to render the corresponding operating relay coil means disabled from effecting power line current interruption, whereby an inadvertent current interruption of the power line by said operating coil means is precluded during the transmission of said direct transfer trip signal over the common active communication channel.

2. Direct transfer trip apparatus which shares a common active communication channel utilized for signal transfer between at least two electromechanical units which in combination form a current differential protective relay for protecting at least one power line in a power system network, each electromechanical unit including an operating relay coil means for effecting an interruption of current through said protected power line when an internal fault of said power line is detected, said direct transfer trip apparatus comprising:

first means, for each electromechanical unit, operative to initiate a direct transfer trip signal for shared transmission with said electromechanical unit signals over said common active communications channel between said at least two electromechanical units of said protective relay;

second means, for each electromechanical unit, operative to receive said direct transfer trip signal from said common active communication channel and generate a trip signal in response thereto;

said common active communications channel including a buffer amplifier and an impedance element coupled in series therewith for each electromechanical unit to form a current path in parallel with the operating relay coil means of its respective electromechanical unit; and third means, for each electromechanical unit, governed by said generated trip signal of its respective electromechanical unit to divert energizing current from the operating relay coil means through said parallel path to prevent energization of the corresponding operating relay coil means, whereby an inadvertent current interruption of the power line by said operating coil means is precluded during the transmission of said direct transfer trip signal over the common active communication channel.

3. Direct transfer trip means in accordance with claim 2 wherein each buffer amplifier is governed by a voltage signal transmitted over the communications channel from a corresponding other electromechanical unit to control the current diverted from the operating relay coil means through the parallel path; and wherein the third means includes means for altering the voltage signal to cause an increase in current through the parallel path.

4. Direct transfer trip means in accordance with claim 3 wherein the third means includes a switch means coupled between the voltage signal and buffer amplifier, said switch means governed by the transfer trip signal to an open position.

* * * * *